(12) United States Patent
Park et al.

(10) Patent No.: US 11,197,321 B2
(45) Date of Patent: *Dec. 7, 2021

(54) METHOD FOR TRANSMITTING OR RECEIVING DATA IN WIRELESS LAN SYSTEM AND DEVICE THEREFOR

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

This patent is subject to a terminal disclaimer.

(21) Appl. No.: 16/742,615

(22) Filed: Jan. 14, 2020

(65) Prior Publication Data

US 2020/0154479 A1    May 14, 2020

Related U.S. Application Data

(63) Continuation of application No. 16/317,808, filed as application No. PCT/KR2017/007559 on Jul. 14, 2017, now Pat. No. 10,575,333.

(60) Provisional application No. 62/381,045, filed on Aug. 30, 2016, provisional application No. 62/369,754, filed on Aug. 2, 2016, provisional application No.

(Continued)

(51) Int. Cl.
*H04L 12/28* (2006.01)
*H04W 74/08* (2009.01)
*H04W 84/12* (2009.01)
*H04W 72/12* (2009.01)
*H04W 74/00* (2009.01)

(Continued)

(52) U.S. Cl.
CPC ....... *H04W 74/0816* (2013.01); *H04W 72/04* (2013.01); *H04W 72/12* (2013.01); *H04W 74/00* (2013.01); *H04W 84/12* (2013.01)

(58) Field of Classification Search
CPC .... H04B 7/088; H04B 7/0684; H04B 7/0417; H04B 7/0695; H04W 16/28; H04W 72/04; H04W 84/12
USPC .......................... 370/252, 329, 386, 442, 443
See application file for complete search history.

(56) References Cited

U.S. PATENT DOCUMENTS 9,960,877 B2    5/2018    Cordeiro et al.
2015/0071185 A1  3/2015   Trainin
(Continued)

FOREIGN PATENT DOCUMENTS

KR    1020100084141    7/2010
KR    1020160041007    4/2016

OTHER PUBLICATIONS

PCT International Application No. PCT/KR2017/007559, International Search Report dated Nov. 17, 2017, 3 pages.

(Continued)

*Primary Examiner* — John Pezzlo
(74) *Attorney, Agent, or Firm* — Lee Hong Degerman Kang & Waimey

(57) ABSTRACT

The present specification relates to a method for transmitting or receiving data by a station in a wireless LAN (WLAN) system and, more particularly, presents a method and device for transmitting or receiving data on the basis of a beamforming training method for a plurality of channels, when a station transmits the data by using the plurality of channels.

9 Claims, 21 Drawing Sheets

Related U.S. Application Data

62/363,327, filed on Jul. 17, 2016, provisional application No. 62/362,598, filed on Jul. 15, 2016.

(51) Int. Cl.
*H04W 72/04* (2009.01)
*H04J 1/16* (2006.01)

(56) References Cited

U.S. PATENT DOCUMENTS

| | | |
|---|---|---|
| 2015/0289147 A1 | 10/2015 | Lou et al. |
| 2016/0087695 A1 | 3/2016 | Wang |
| 2017/0048048 A1* | 2/2017 | Seok ................. H04L 1/1896 |
| 2017/0317727 A1 | 11/2017 | Wang et al. |
| 2017/0353984 A1 | 12/2017 | Abdaliah et al. |
| 2019/0068258 A1* | 2/2019 | Oteri ................. H04B 7/0617 |
| 2019/0140730 A1 | 5/2019 | Oteri et al. |
| 2019/0200388 A1 | 6/2019 | Park et al. |

OTHER PUBLICATIONS

Nitsche, T. et al., "IEEE 802.11ad: Directional 60 GHz Communication for Multi-Gigabit-per-Second Wi-Fi," Radio Communications, IEEE Communications Magazine, Dec. 2014, 10 pages.

U.S. Appl. No. 16/317,808, Office Action dated Jun. 13, 2019, 14 pages.

U.S. Appl. No. 16/317,808, Notice of Allowance dated Oct. 7, 2019, 11 pages.

Assaf Kasher, "Beamforming Training proposals", IEEE 802.11-16/0103r0, Jan. 18, 2016, see slides 3, 8-10.

* cited by examiner

FIG. 9

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: Legacy, GF: Gap Filling, ay: 802.11ay)

METHOD FOR TRANSMITTING OR RECEIVING DATA IN WIRELESS LAN SYSTEM AND DEVICE THEREFOR

CROSS-REFERENCE TO RELATED APPLICATIONS

This application is a continuation of U.S. patent application Ser. No. 16/317,808, filed on Jan. 14, 2019, now U.S. Pat. No. 10,575,333, which is the National Stage filing under 35 U.S.C. 371 of International Application No. PCT/KR2017/007559, filed on Jul. 14, 2017, which claims the benefit of U.S. Provisional Application No. 62/362,598, filed on Jul. 15, 2016, 62/363,327, filed on Jul. 17, 2016, 62/369,754, filed on Aug. 2, 2016, and 62/381,045, filed on Aug. 30, 2016, the contents of which are all hereby incorporated by reference herein in their entirety.

BACKGROUND OF THE INVENTION

Field of the Invention

The following description relates to a signal transmission/reception method of a station in a wireless LAN (WLAN) system and, more particularly, to a method of performing beamforming training on multiple channels, in case a station transmits and/or receives a signal through the multiple channels, and a method of transmitting/receiving a signal based on the beamforming training and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission ate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

In a 11ay system applicable to the present invention, a station is capable of transmitting data using/through all or part of multiple channels supported by the system.

In particular, considering that a frequency resource supported by the 11ay system applicable to the present invention, is in a high frequency band, not omni data transmission but directional data transmission toward a particular beam direction may be needed for more reliable data transmission.

For these reasons, when the station wishes to transmit and receive data through at least one channel (especially, through multiple channels), a method for performing beamforming for a channel through which the data is to be transmitted and received and a method for transmitting and receiving data based on the aforementioned method are proposed.

In one general aspect of the present invention to achieve the aforementioned object, there is provided a method for transmitting data by a first station (STA) to a second STA using/through at least one channel in a wireless LAN (WLAN) system, the method including: performing first beamforming training on one of multiple channels supported by the WLAN system with the second STA; determining at least one channel, through which data is to be transmitted, and a data transmission method using/through the determined at least one channel by transmitting and receiving signals with the second STA using/based on best sector information for the one channel determined in the first beamforming training; and transmitting the data to the second STA through the determined at least one channel by applying the determined data transmission method to the determined at least one channel.

The one channel may be a primary channel set in the WLAN system.

The performing of the first beamforming training on the one channel may include: transmitting, by the first STA, one or more Sector Sweep (SSW) frame or a short SSW frame to the second STA through the one channel; receiving an SSW acknowledgement (ACK) from the second STA through the one channel; and determining the best sector information for the one channel based on the received SSW ACK.

The determining of the at least one channel, through which data is to be transmitted, and the data transmission method using/through the determined at least one channel by transmitting and receiving the signals with the second STA using/based on the best sector information for the one channel determined in the first beamforming training may include: transmitting, by the first STA, a setup frame for each channel to the second STA by applying the best sector information for the determined one channel determined in the first beamforming training to all or part of the multiple channels including the one channel; receiving a feedback frame for each setup frame for each channel from the second STA through each channel; and based on the received feedback information, determining at least one channel, through which the data is to be transmitted, and a data transmission method using/through the at least one channel.

The setup frame may be a Ready To Send (RTS) frame, and the feedback frame may be a Clear To Send (CTS) frame.

The feedback information may include channel information and channel bandwidth information for transmitting the data.

The data transmission method may include: a channel bonding method for transmitting the data by bonding multiple consecutive channels; or a channel aggregation method for transmitting the data by aggregating multiple consecutive or non-consecutive channels.

The transmitting the data to the second STA through the determined one channel by applying the determined data transmission method to the at least one channel may include transmitting the data to the second STA through the determined at least one channel by applying the best sector information for the one channel and the determined data transmission method to the determined at least one channel.

The method for transmitting data may include performing second beamforming training on the determined at least one channel.

The transmitting of the data to the second STA through the determined at least one channel by applying the determined data transmission method to the determined at least one channel may include transmitting the data to the second STA through the determined at least one channel by applying best sector information determined in the second beamforming training and the determined data transmission method to the determined at least one channel.

The performing of the second beamforming for the second STA and the determined at least one channel may include: transmitting, by the first STA, one or more Sector Sweep (SSW) frames, a short SSW frame, or a Beam Refinement Protocol (BRP) frame to the second STA through the determined at least one channel by applying the determined data transmission method to the determined at least one channel; receiving, by the first STA, a response frame for a transmitted frame from the second STA through the determined at least one channel; and determining best sector information for the at least one channel based on the received response frame.

In another general aspect of the present invention, there is provided a method for receiving data by a first station (STA) from a second STA using/through at least one channel in a wireless LAN (WLAN) system, the method including: performing first beamforming training on one of multiple channels supported by the WLAN system with the second STA; determining at least one channel, through which data is to be received, and a data transmission method using/through the at least one channel by transmitting and receiving signals with the second STA using/based on best sector information for the one channel determined in the first beamforming training; and receiving the data transmitted through the determined at least one channel, by applying the determined data transmission method to the determined at least one channel.

In yet another general aspect of the present invention, there is provided a station (STA) for transmitting data using/through at least one channel in a wireless LAN (WLAN) system, the station including: a transceiver having one or more Radio Frequency (RF) chains and configured to transmit and receive signals to and from another station; and a processor connected to the transceiver and configured to process the signals transmitted or received with the another station, wherein the processor is further configured to: perform first beamforming training on one of multiple channels supported by the WLAN system with the another STA; determine at least one channel, through which data is to be transmitted, and a data transmission method using/through the determined at least one channel by transmitting and receiving signals with the another STA using/based on best sector information for the one channel determined in the first beamforming training; and transmitting the data to the another STA through the determined at least one channel by applying the determined data transmission method to the determined at least one channel.

In yet another general aspect of the present invention, there is provided a station (STA) for receiving data using/through at least one channel in a wireless LAN (WLAN) system, the station including: a transceiver having one or more Radio Frequency (RF) chains and configured to transmit and receive signals with another STA; and a processor connected to the transceiver and configured to process the signals transmitted and received with the another STA, wherein the processor is further configured to: perform first beamforming training on one of multiple channels supported by the WLAN system with a second STA; determine at least one channel, through which data is to be received, and a data transmission method using/through the determined at least one channel by transmitting and receiving signals with the second STA using/based on best sector information for the one channel determined in the first beamforming training; and receive the data transmitted through the determined at least one channel, by applying the determined data transmission method for the determined at least one channel.

With the above-described configurations, a station according to the present invention is capable of transmitting and receiving data more reliably.

In particular, in consideration that each of the multiple channels possibly has different characteristics, the station according to the present invention is capable of performing a beamforming operation optimized to data transmission through the multiple channels and thus transmitting and receiving data more reliably.

Effects of the present invention should not be limited to the aforementioned effects and other unmentioned effects will be clearly understood by those skilled in the art from the following description.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
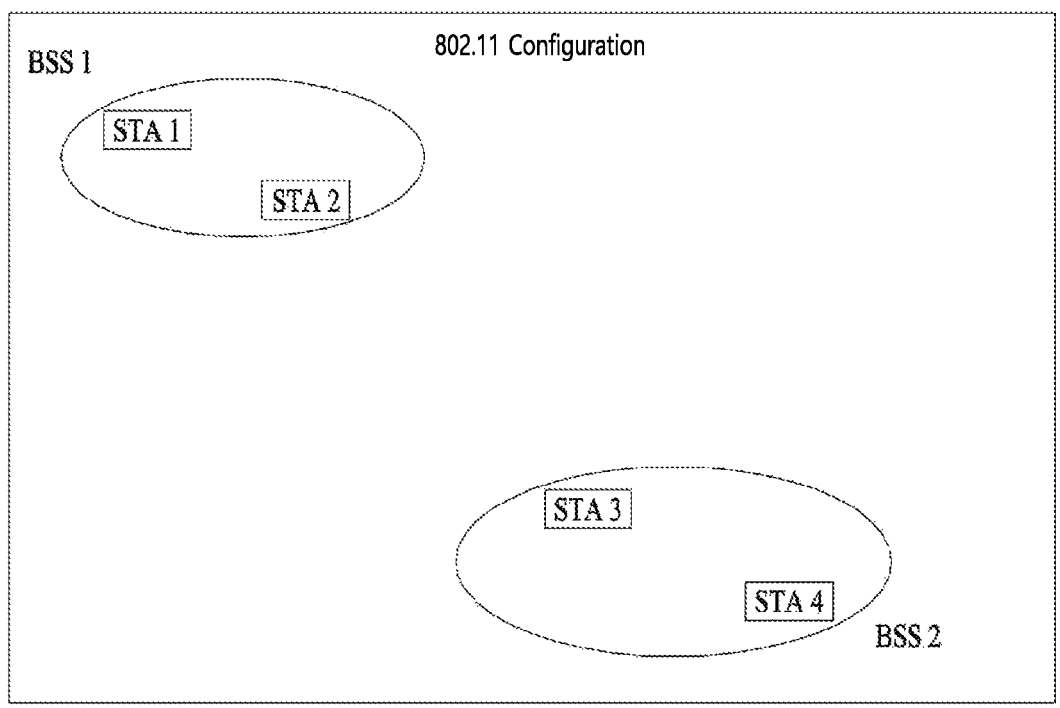
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (MSS).

The BSS shown in FIG. 1 corresponds to an MSS. The MSS refers to a BSS that does not include an AP. And, since the BSS does not include an AP, access to the DS is not authorized (or approved), and, therefore, the MSS functions as a self-contained network.

Figure 2:
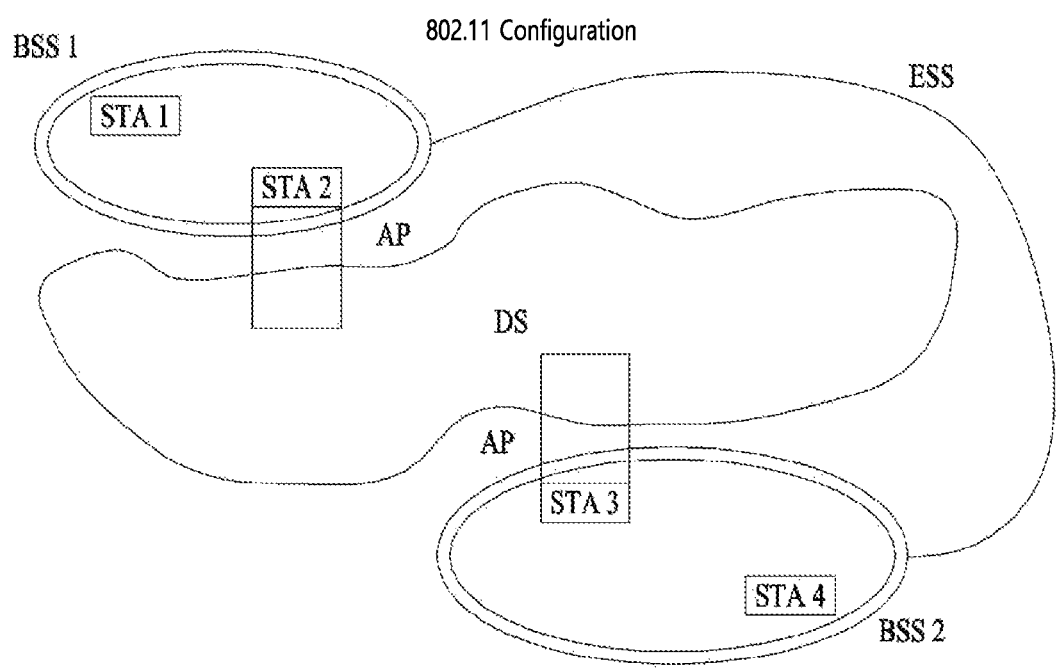
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
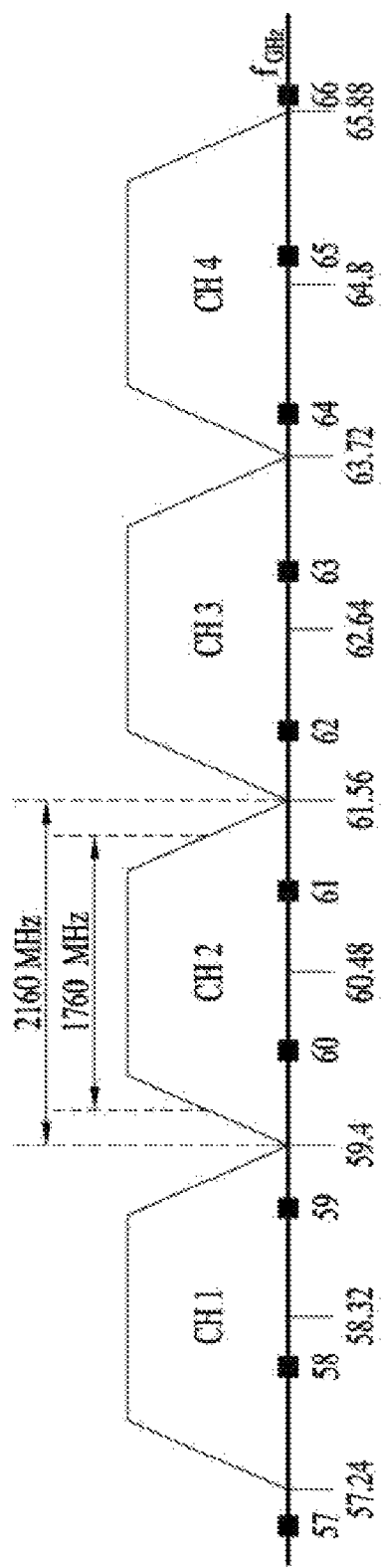
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
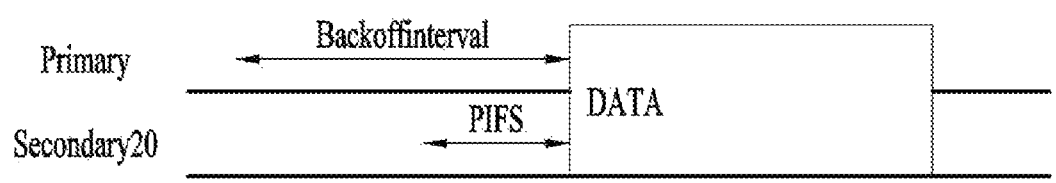
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using/through) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using/based on a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
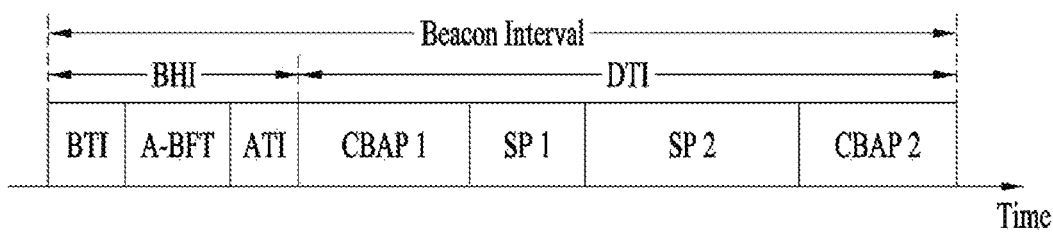
FIG. 5 is a diagram describing a configuration of a beacon interval.

FIG. 5 is a diagram describing a configuration of a beacon interval.

In an 11 ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown in FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY (SC PHY) | 1 ... 12 25 ... 31 | (low power SC PHY) |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
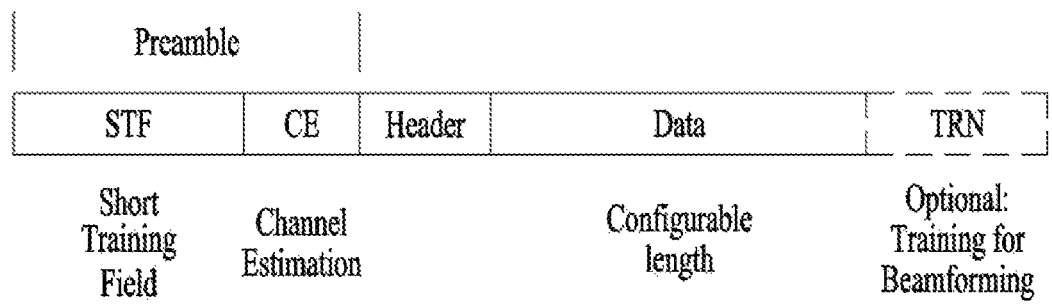
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
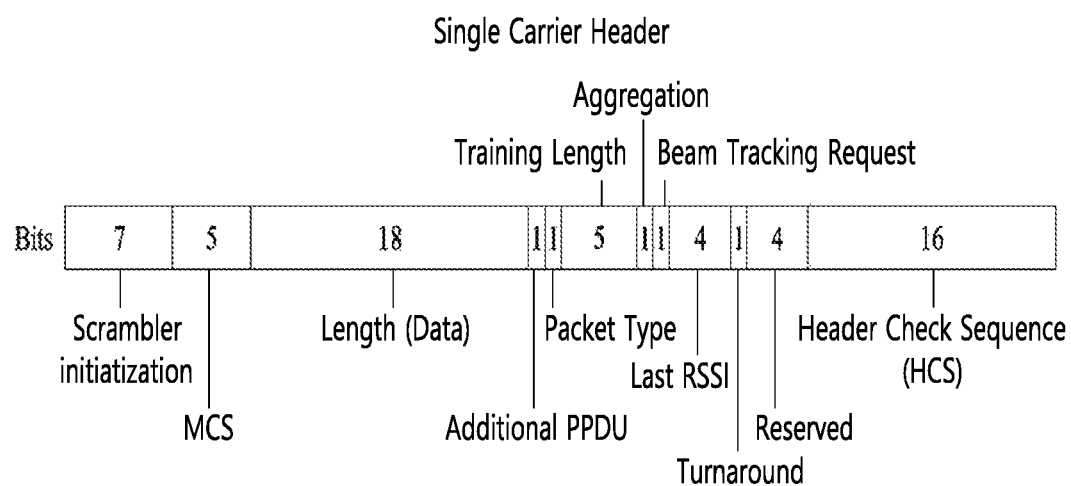
FIG. 7 and FIG. 8 are diagrams describing a configuration of a header field of the radio frame shown in FIG. 6.
Figure 8:
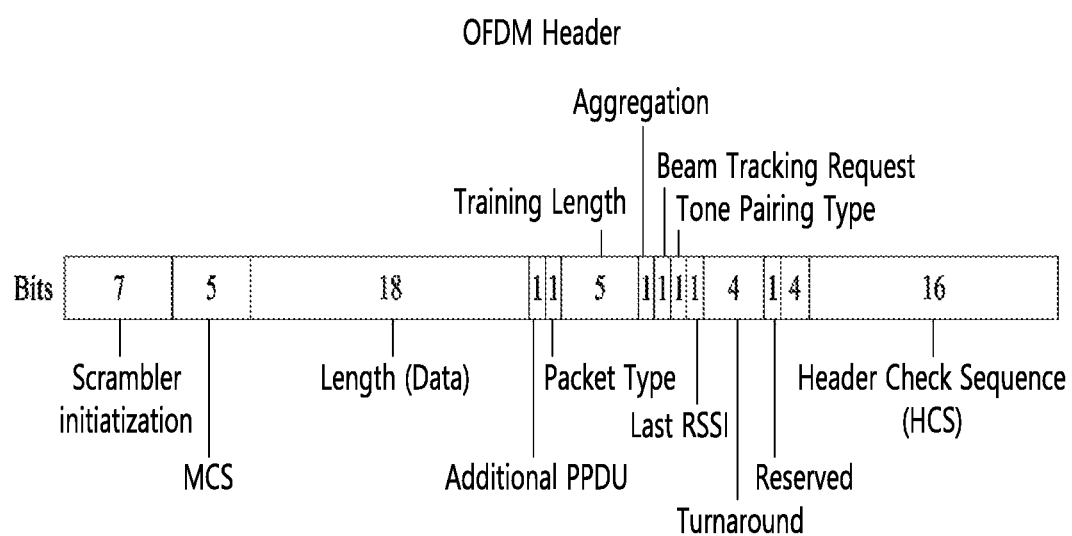

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as int he case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using/based on the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
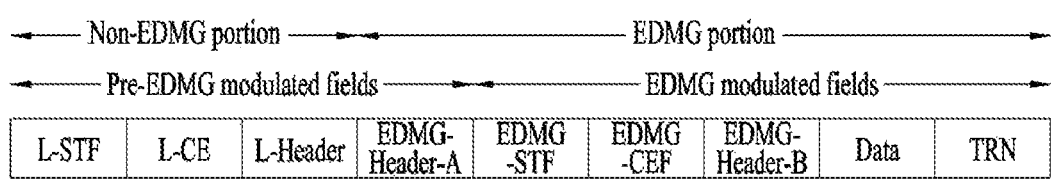
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

3. Beamforming Procedure that is Applicable to the Present Invention

As described above, methods such as channel bonding, channel aggregation, FDMA, and so on, which transmit data by using/through multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

3.1. Performing Beamforming for Only One Channel

Figure 11:
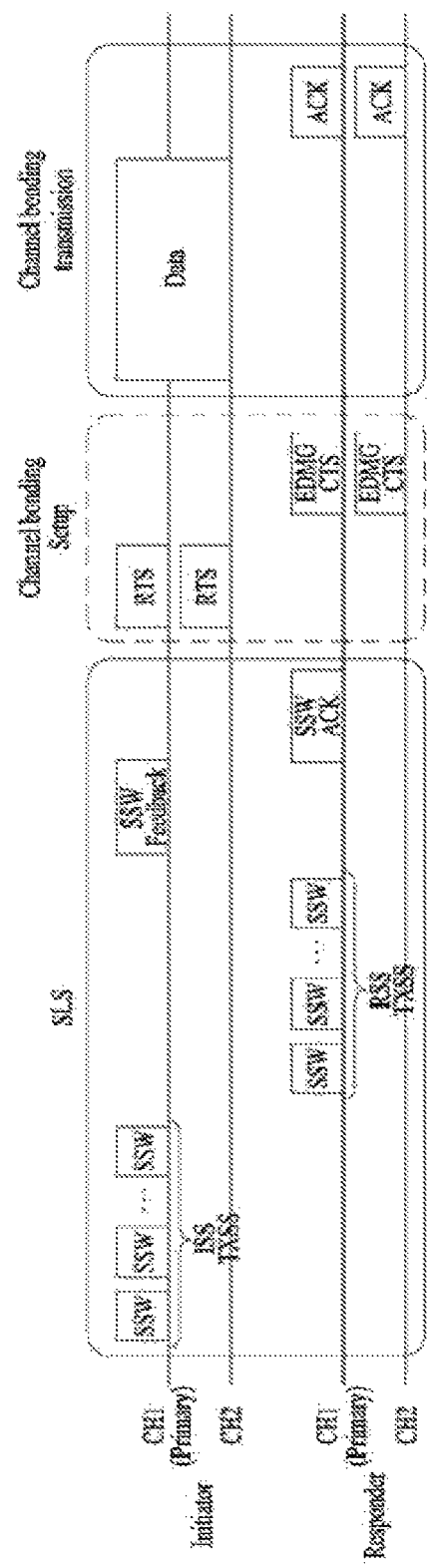
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

3.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
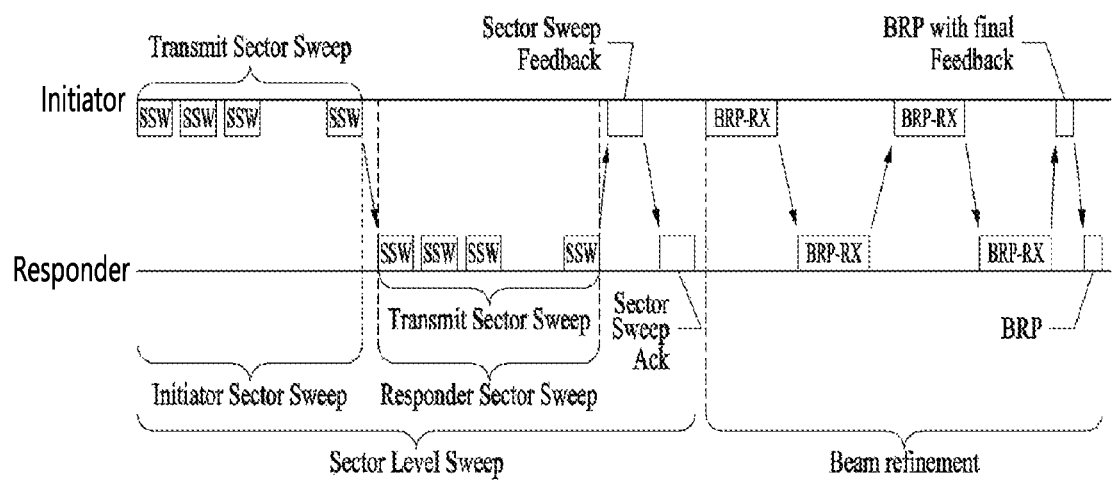
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
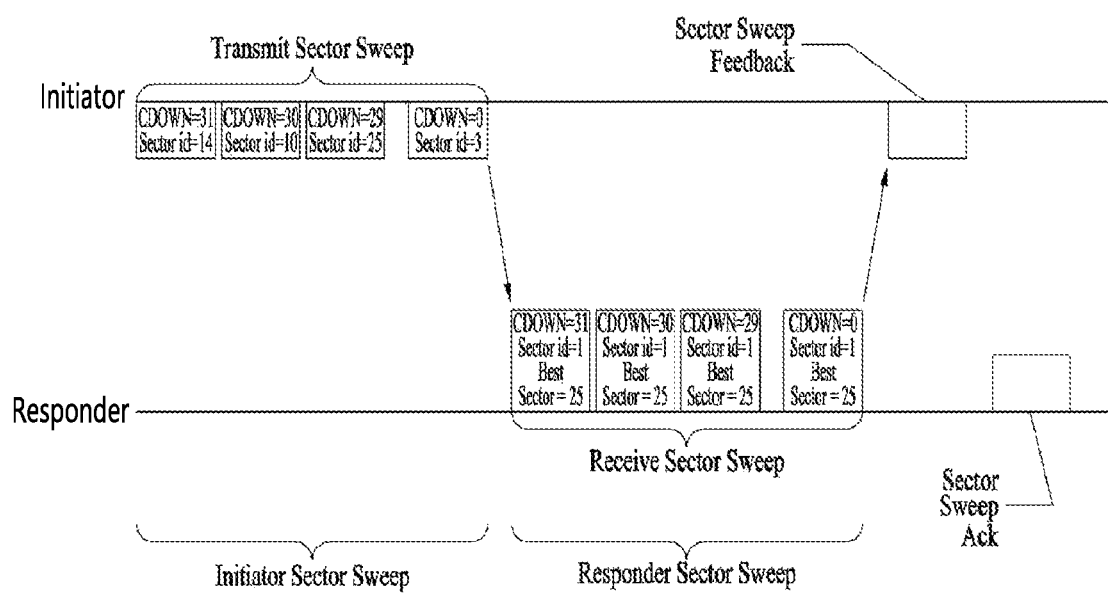
FIG. 13 and FIG. 14 is a diagram showing examples of a Sector Level Sweep (SLS) phase.
Figure 14:
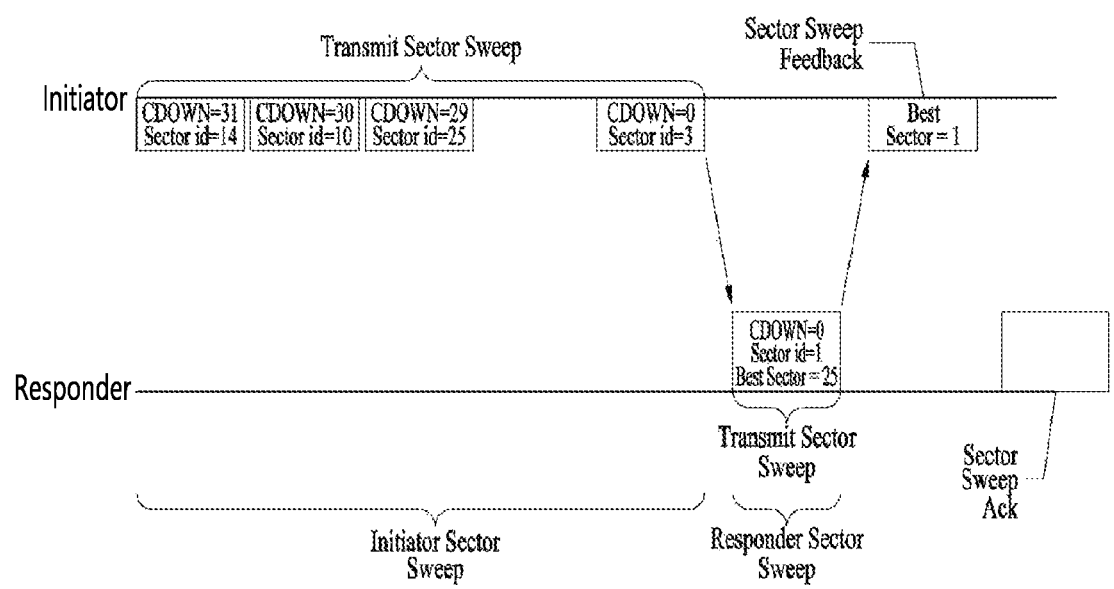

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training on the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using/based on a BRP frame, which is defined for the BRP protocol and which includes beam training information and information reporting the training results. For example, the BRP corresponds to a beam training method, wherein a BRP frame is transmitted and/or received by using/based on a beam that is determined by a previous beam training, and wherein a beam training is actually performed by using/based on a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the hay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

3.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using/through multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training on one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

3.1.3. Channel Bonding Transmission Phase

As shown in FIG. 11, after receiving the DMG CTS, which corresponds to the response to the transmitted RTS, the initiator may transmit actual data through multiple idle channels by using/based on information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using/Based on the above-described method, the initiator and the responder may acquire information on the channel that can actually be used for the data transmitted, and the initiator may transmit data through channels that can actually be used.

At this point, since the initiator and the responder have already performed the beamforming training on only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using/based on channel bonding, the initiator may also transmit data by using/based on the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3.2. Performing Beamforming for Multiple Channels

Hereinafter, a beamforming procedure, wherein the above-described beamforming operation is performed on multiple channels (preferably, channels to and from which the initiator and responder are to transmit and/or receive data), will be described in detail.

The above-described beamforming training operation for one channel may not be optimized to the channel bonding process that uses multiple channels for the reasons listed below.

The characteristics of the one channel may not be the same as the characteristics of other channels.

The beamforming training result for the one channel may be different from the beamforming training result for the entire bandwidth.

Accordingly, in this section, as a solution (or method) for maximizing the capability gain in accordance with the channel bonding process, a detailed solution (or method) for performing beamforming training on the entire bandwidth, which is used for the channel bonding process, will hereinafter be described in detail.

Figure 15:
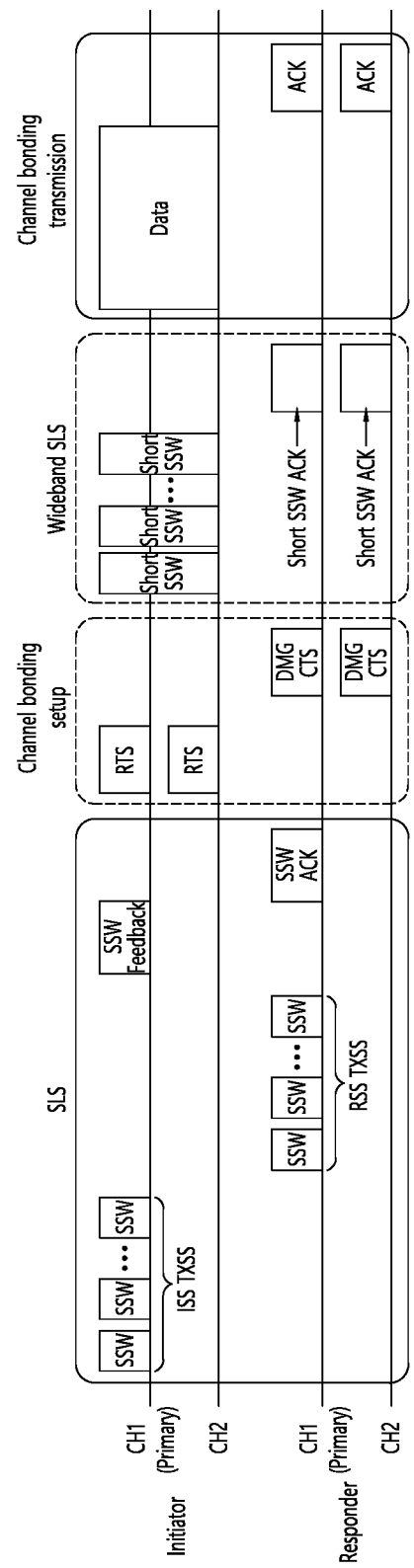
FIG. 15 is a diagram showing operations for performing beamforming on multiple channels according to another exemplary embodiment of the present invention.

FIG. 15 is a diagram showing operations for performing beamforming on multiple channels according to another exemplary embodiment of the present invention. Just as in the case shown in FIG. 11, referring to FIG. 15, an STA that intends to transmit data through the beamforming operation is referred to as an initiator, and an STA that receives the data from the initiator is referred to as a responder. Also, although only a total of 2 channels (e.g., CH1, CH2) are shown in FIG. 15, the configuration of the present invention may also be extendedly applied to channel bonding, channel aggregation, and so on, through 3 or more channels.

As shown in FIG. 15, the operation of performing beamforming for multiple channels according to another exemplary embodiment of the present invention may include a SLS phase, a channel bonding setup phase, a wideband SLS phase, and a channel bonding transmission phase. At this point, the wideband SLS phase will not be limited to the related art SLS configuration, and, therefore, the wideband SLS phase may include all beamforming training methods that can be extended to wideband beamforming training. For example, the wideband SLS phase may be replaced with a wideband BRP phase, which extendedly applies the related art BRP phase, or may include the wideband BRP phase.

Figure 16:
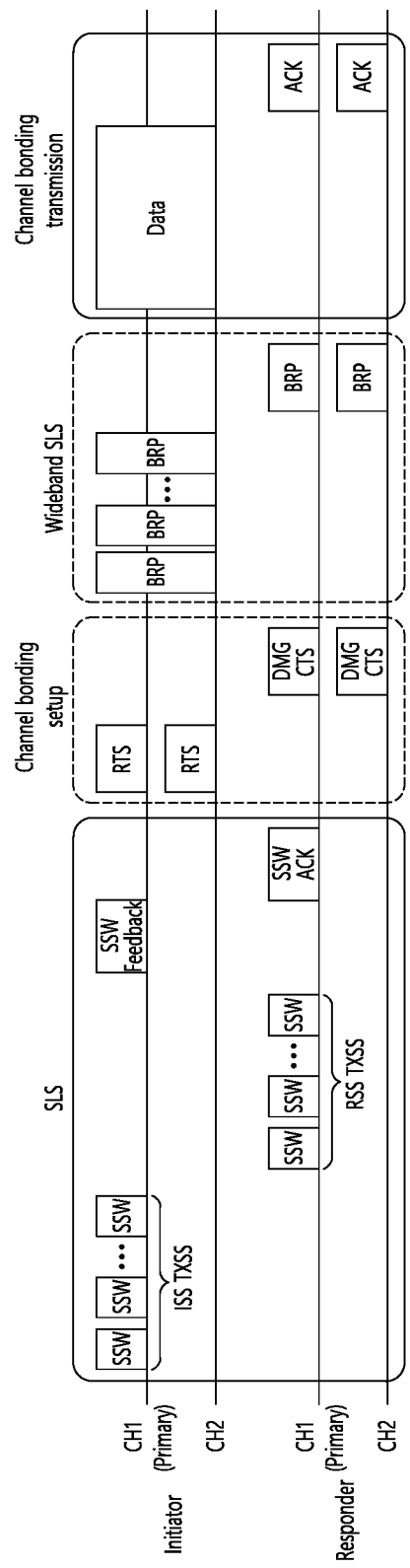
FIG. 16 is a diagram showing operations for performing beamforming on multiple channels according to yet another exemplary embodiment of the present invention.

FIG. 16 is a diagram showing operations for performing beamforming on multiple channels according to yet another exemplary embodiment of the present invention.

As described above, the wideband SLS phase of FIG. 15 may also be replaced with the wideband BRP phase of FIG. 16. Alternatively, according to yet another exemplary embodiment of the present invention, the wideband SLS phase of FIG. 15 may also be configured as a wideband beamforming training phase further including a wideband BRP phase.

3.2.1. SLS Phase

Just as in the above-described operations, which are described above in Section 3.1.1., the initiator and the responder may perform the SLS phase. By performing this phase, the initiator and the responder may perform beamforming training on one channel (e.g., primary channel).

Since the SLS phase has already been described above in detail, a detailed description of the same will be omitted for simplicity.

3.2.2. Channel Bonding Setup Phase

As described above in Section 3.1.2., the initiator and the responder may transmit and/or receive an RTS (setup frame) and a DMG CTS (feedback frame) through the channel bonding setup phase, and, then, the initiator and the responder may transmit and/or receive information for channel bonding, channel aggregation, FDMA transmission, and so on.

Moreover, in addition to the information mentioned above, the initiator and the responder may simultaneously transmit and/or receive information on the method for performing beamforming training on multiple channels to and from one another.

The initiator may notify the responder of the performance or non-performance of the beamforming training on multiple channel through a setup frame or RTS frame. For this, the initiator may transmit the setup frame or RTS frame including the information indicating the performance or non-performance of beamforming training on the multiple channels to the responder.

The responder may notify to the responder whether or not the beamforming training on multiple channels can be performed through a feedback frame or DMG CTS frame. For this, the responder may transmit the feedback frame or DMG CTS frame, which includes the information indicating whether or not the beamforming training on multiple channels can be performed, to the initiator.

Additionally, the responder may notify to the initiator which one of Initiator TX Sector Sweep (I-TXSS), Initiator RX Sector Sweep (I-RXSS), Responder TX Sector Sweep (R-TXSS), and Responder RX Sector Sweep (R-RXSS) is to be performed in the subsequent wideband SLS phase through the feedback frame or DMG CTS frame. Moreover, the responder may notify whether or not to perform beam training on the TX and the RX at the same time through the feedback frame or DMG CTS frame.

Alternatively, the responder may notify whether TX beamforming training is to be performed or whether RX beamforming training is to be performed is to be performed in the wideband BRP phase through the feedback frame or DMG CTS frame. Alternatively, the responder may notify whether or not to perform beam training on the TX and the RX at the same time through the feedback frame or DMG CTS frame.

As shown in the above-described configurations, the beamforming training related information that is transmitted and received by the initiator and the responder to and from one another in the channel bonding setup phase may be included in any one of the setup frame and the feedback frame.

Additionally, in case the initiator intends to transmit data to the responder by using/based on the FDMA method, the initiator may perform the FDMA transmission setup through the channel bonding set up phase.

More specifically, the initiator may signal a resource unit (RU) allocation, a channel feedback request, a report method, and so on, through a setup frame (or RTS frame).

Additionally, the responder may notify a Signal to Noise Ratio (SNR) or Signal to Interference & Noise Ratio (SINR) through a feedback frame by using/based on feedback values corresponding to the available channels.

As described above, the initiator and the responder may transmit and/or receive the RTS frame and the DMG CTS frame to and from one another through the channel bonding setup phase. At this point, since the initiator and the responder has performed the beamforming training on one channel (e.g., primary channel) through the above-described SLS phase, the initiator and the responder may also transmit and/or receive the RTS frame and the DMG CTS frame by applying the same best sector direction for the one channel to other channels as well. At this point, the RTS frame and the DMG CTS frame that are transmitted through each of the channels may be duplicated and transmitted for each channel.

3.2.3. Wideband SLS/BRP Phase

Figure 17:
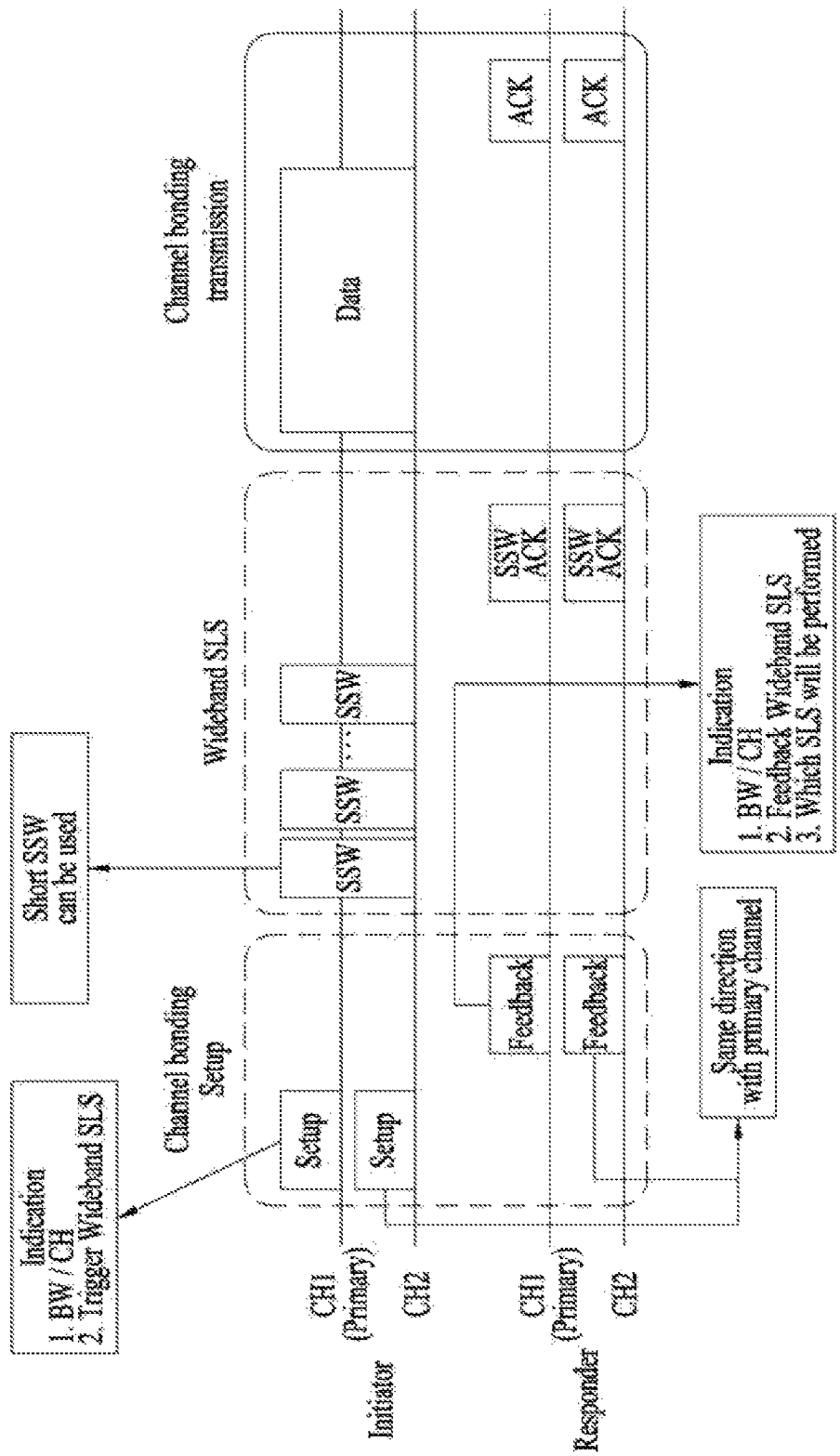
FIG. 17 is a diagram showing in more detail beamforming operations applying a wideband SLS phase according to an exemplary embodiment of the present invention.
Figure 18:
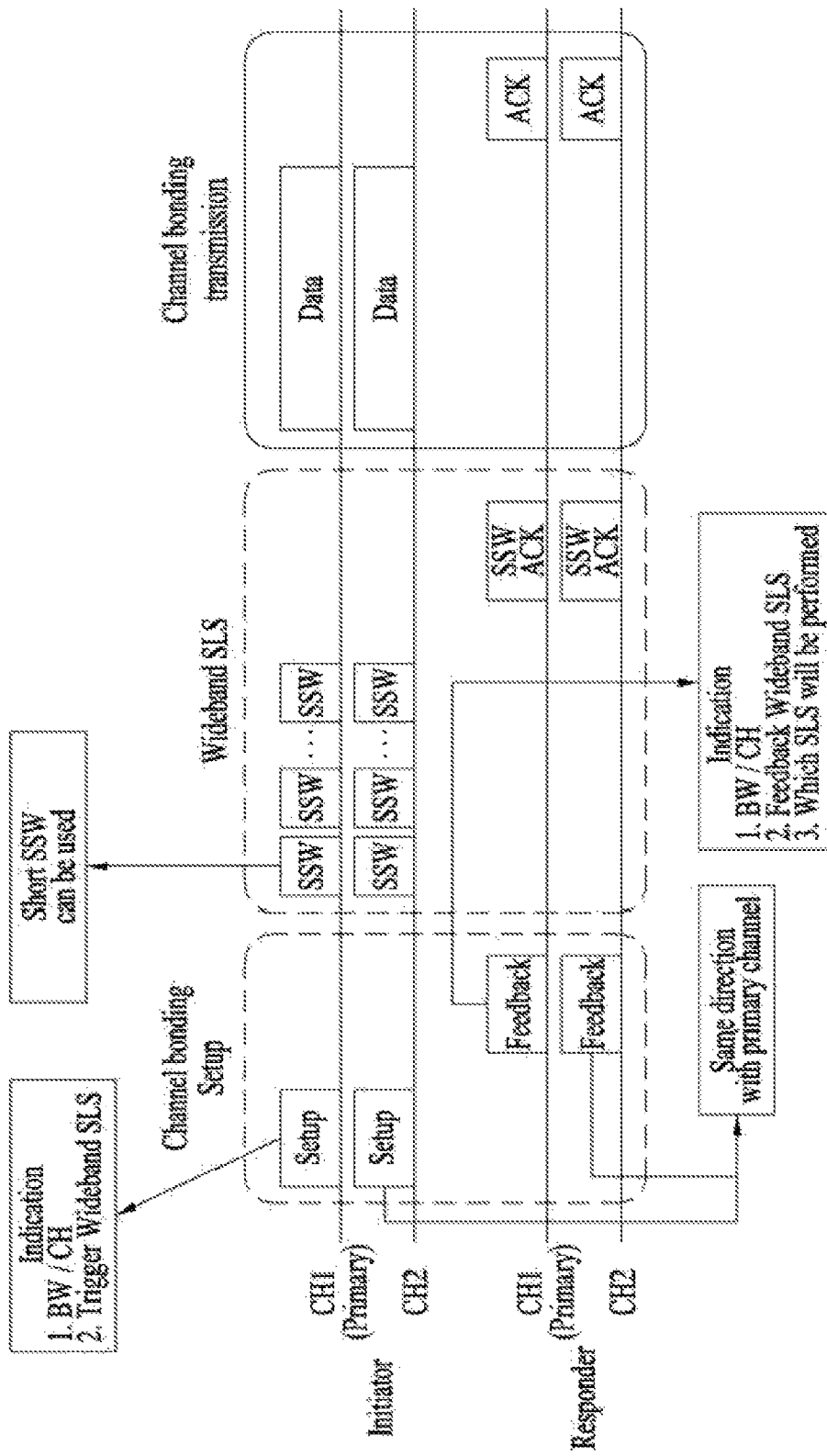
FIG. 18 is a diagram showing in more detail beamforming operations applying a wideband SLS phase according to another exemplary embodiment of the present invention.

FIG. 17 is a diagram showing in more detail beamforming operations applying a wideband SLS phase according to an exemplary embodiment of the present invention, and FIG. 18 is a diagram showing in more detail beamforming operations applying a wideband SLS phase according to another exemplary embodiment of the present invention.

As shown in FIG. 17 and FIG. 18, the initiator and the responder may signal diverse information through the setup frame and the feedback frame, which are transmitted and/or received during the channel bonding setup phase. This has already been described above in detail, and, therefore, a detailed description of the same will be omitted for simplicity.

At this point, the wideband SLS phase according to the examples shown in FIG. 17 and FIG. 18 may be replaced with the wideband BRP phase, as shown in FIG. 16. Herein, during the wideband BRP phase, the initiator and the responder may perform the beamforming training by combining (or aggregating) the BRP frame and the TRN field, which is positioned at the end of the PPDU, instead of the SSW/short-SSW.

Hereinafter, an exemplary embodiment in which the wideband SLS phase is applied, as shown in FIG. 17 and FIG. 18, will be described in detail.

Although FIG. 17 and FIG. 18 only show examples of the initiator transmitting the SSW frame, in the wideband SLS phase, the initiator may transmit both SSW frame and Short-SSW frame (or may select and transmit only one of the two frames). In response to such transmission, the responder may transmit both SSW feedback frame and Short-SSW feedback frame (or may select and transmit only one of the two feedback frames), and the responder may also transmit both SSW ACK feedback frame and Short SSW ACK feedback frame.

FIG. 17 and FIG. 18 only show the TXSS procedure of the initiator. Herein, as shown in FIG. 17 and FIG. 18, after receiving a feedback frame, which corresponds to a response to the transmitted setup frame, the initiator may perform the negotiated beamforming training method with the responder through multiple channels.

Additionally, the beamforming training method that can be applied to the present invention includes I-TXSS, I-RXSS, R-TXSS, R-RXSS, and so on. At this point, during the wideband SLS phase, each of the initiator and the responder may individually perform beamforming training, or the initiator and the responder may combine the beamforming training and perform TX beam training and RX beam training at the same time.

Most particularly, in case the initiator wishes to transmit data by using/based on the channel aggregation method instead of the channel bonding method, the initiator and the responder may also perform the beamforming training in a channel aggregation format.

As reference, the difference in the bandwidth due to the channel bonding and the channel aggregation will hereinafter be described in detail with reference to FIG. 19.

Figure 19:
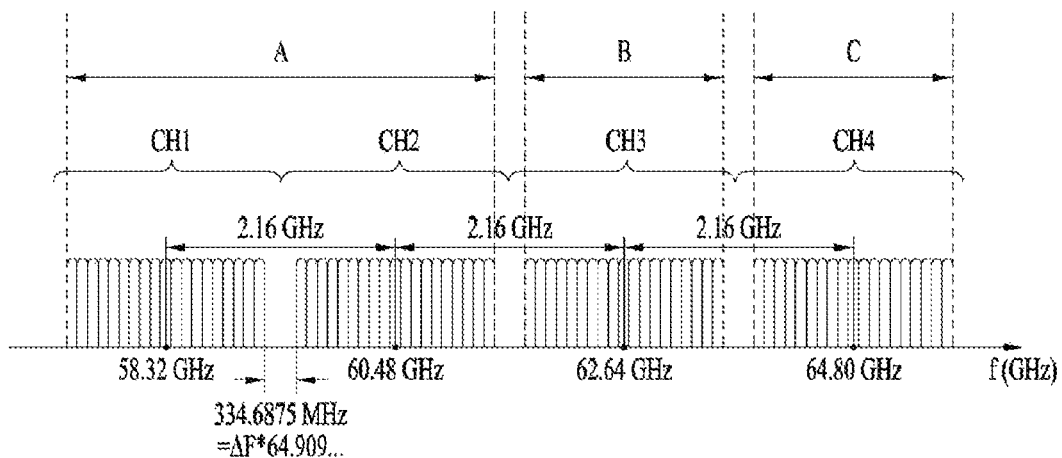
FIG. 19 is a diagram briefly showing a bandwidth corresponding to channel bonding and channel aggregation according to an exemplary embodiment that is applicable to the present invention.

FIG. 19 is a diagram briefly showing a bandwidth corresponding to channel bonding and channel aggregation according to an exemplary embodiment that is applicable to the present invention.

Referring to FIG. 19, A refers to a bandwidth corresponding to a case where channel bonding is performed on CH1 and CH2, and B+C refers to a bandwidth corresponding to a case where channel aggregation is performed on CH3 and CH4.

As described above, in a case where consecutive channels are bonded, a bandwidth including a gap (e.g., 334.6875 MHz) between each channel may be used as the bandwidth for the channel bonding.

Alternatively, in a case where non-consecutive channels are aggregated, a bandwidth that does include the gap between the channels may be used as the bandwidth for the channel aggregation.

Hereinafter, a difference in the wideband SLS phases according to FIG. 17 and FIG. 18 will be described in detail.

As shown in FIG. 17, the initiator may transmit the SSW frame (or Short SSW frame) in a channel bonding format, or the initiator may also duplicate and transmit the SSW frame (or Short SSW frame) for each channel.

In response to such transmission, the responder may transmit a response frame (e.g., SSW ACK or Short SSW ACK) to the initiator as a result of the sector sweep process performed by the initiator. At this point, the response frame may be transmitted in the channel bonding format (or wideband format), or the response frame may be duplicated and transmitted for each channel.

Preferably, if R-TXSS has been performed via wideband (or in the channel bonding format), the responder may transmit the response frame via wideband (or by using/based on the channel bonding method). This is because the beamforming training result value according to the R-TXSS corresponds to the optimal beam direction for the signal transmission, which is based on the wideband (or the channel bonding method).

Also, preferably, if the R-TXSS has not been performed via wideband (or in the channel bonding format), the responder may duplicate and transmit the response frame for each channel. This is because, since the beamforming training according to the R-TXSS has not been performed via wideband (or in the channel bonding format), the transmission beam direction of the responder is used as the optimal beam direction for the signal transmission corresponding to each channel.

However, the R-TXSS may be performed in a case where data or another signal that is to be transmitted to the initiator by the responder exists. In other words, in a case where only the initiator transmits data to the responder by using/based on the channel bonding method, the R-TXSS may be omitted. Accordingly, the responder may duplicate and transmit the response frame (e.g., SSW ACK) for each channel, as shown in FIG. 17 and FIG. 18.

As another example, a wideband BRP phase may be applied instead of the wideband SLS phase of FIG. 17 and FIG. 18 (or in addition to the wideband SLS phase).

During the wideband BRP phase, a BRP phase is transmitted. Alternatively, a new BRP frame, which is configured of information on a wideband channel being additionally included in a BRP frame defined in the related art 11 ad system, may be transmitted.

More specifically, the responder transmits a setup frame during the channel bonding setup phase and may then receive a feedback frame, which correspond to a response to the transmitted setup frame. Subsequently, a beamforming training method, which is negotiated by transmitting and/or receiving the setup frame and the feedback frame, is performed with the responder through multiple channels.

At this point, the applicable beamforming training methods may include TX, RX, TX, RX, and so on.

Additionally, as described above, in case the initiator wishes to transmit data by using/based on the channel aggregation method instead of the channel bonding method, the initiator and the responder may perform the beamforming training in the channel aggregation format.

As described above, the initiator may perform beamforming training on multiple channels by transmitting a BRP frame to the responder. As a response to such transmission, the responder may transmit the result of the beamforming training performed by the initiator in a wideband format (or in a channel bonding format), or the responder may duplicate and transmit the corresponding beamforming result for each channel.

Preferably, if the TX beamforming training of the responder has been performed in a wideband format (or in the channel bonding format), the responder may transmit the beamforming training result in a wideband format (or in the channel bonding format). This is because the TX beamforming training result of the responder corresponds to the optimal beam direction for the response frame transmission, which is based on the wideband format (or the channel bonding format).

Alternatively, if the TX beamforming training of the responder has not been performed in a wideband format (or in the channel bonding format), the responder may duplicate and transmit the beamforming training result for each channel. This is because, since the TX beamforming training result of the responder has not been performed in the wideband format (or in the channel bonding format), the transmission beam direction of the responder is used as the optimal beam direction for the signal transmission corresponding to each channel.

3.2.4. Channel Bonding Transmission Phase

Similarly to Section 3.1.3., the initiator and the responder may transmit and/or receive actual data based on the beamforming training result for multiple channels by performing the above-described phases (or process steps). More specifically, the initiator and the responder may transmit/receive channel information on the channels, which are negotiated through the transmission/reception of the RTS frame and DMG CTS frame, and information on the channel bandwidth. And, then, the initiator and the responder perform beamforming training on the multiple channels by using/based on the transmitted/received information. Thereafter, the initiator and the responder transmit/receive data based on the beamforming training result. Herein, since the beamforming training has already been performed for an ideal channel, the data may also be transmitted/received through an ideal channel.

According to this exemplary embodiment, since the initiator and the responder have already performed beamforming training on one channel (e.g., primary channel) as well as beamforming training on multiple channels, the initiator and the responder may achieve an optimal link budget when performing the data transmission method by using/based on the multiple channels, such as channel bonding, channel aggregation, FDMA, and so on.

At this point, as a response to the received data, the responder may transmit an ACK frame by using/through the multiple channels through which the data has been received. As a method for performing this process, the responder may transmit an ACK frame by using a channel bonding method through multiple channels, or the responder may duplicate and transmit an ACK frame for each channel. As a preferred example, if the TX beamforming process of the responder has been performed by using/based on the channel bonding method, the responder may transmit the ACK frame in a channel bonding format. This is because the result of the TX beamforming training process of the responder indicates an optimal beam direction for the signal transmission of the channel bonding format.

Figure 20:
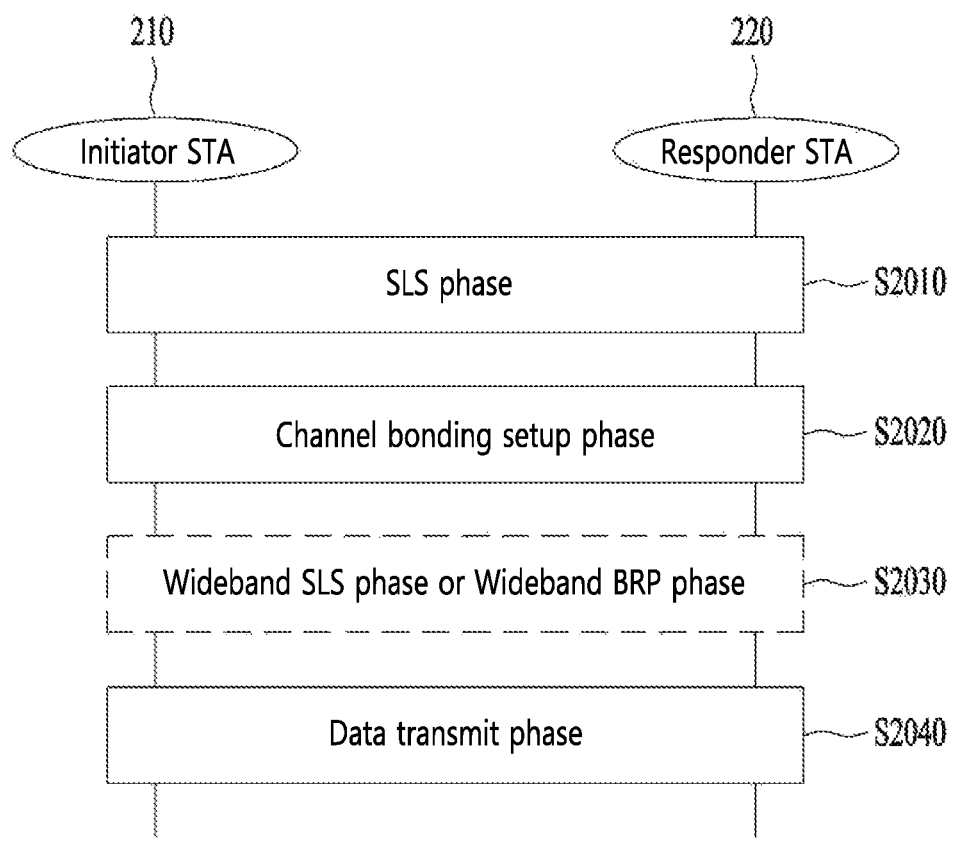
FIG. 20 is a diagram showing a data transmission/reception method of a station that is applicable to the present invention.

FIG. 20 is a diagram showing a data transmission/reception method of a station that is applicable to the present invention. For simplicity in the description, referring to FIG. 20, it will be assumed that an initiator STA (210) refers to an STA that transmits data, and a responder STA (220) refers to an STA that receives data being transmitted from the initiator STA (210). However, according to an actual embodiment, in each of the phases that will hereinafter be described in detail, each STA may be consistently operated interchangeably as the initiator STA (210) and the responder STA (220). In other words, each STA may be operated as the initiator STA (210) and/or the responder STA (220), as required, in each of the phases that will be described below.

Herein, the initiator STA (210) may correspond to a PCP/AP STA, and the responder STA (220) may correspond to a Non-PCP/AP STA. Alternatively, the initiator STA (210) may correspond to a Non-PCP/AP STA, and the responder STA (220) may correspond to a PCP/AP STA. Alternatively, the initiator STA (210) and the responder STA (220) may both correspond to the PCP/AP STA or the Non-PCP/AP STA.

As shown in FIG. 20, the data transmission/reception method of a station that is applicable to the present invention may be configured of 3 phases (or steps) (S2010, S2020, S2040) or 4 phases (or steps) (S2010, S2020, S2030, S2040) according to the exemplary embodiment of the present invention. In the following description of the present invention, the characteristics that will be commonly described may be commonly applied to the data transmission/reception method being configured of 3 phases or 4 phases, and the characteristics that will be described as differences between to two types of methods may be distinctively applied to each configuration.

Firstly, in step S2010, the initiator STA (210) and the responder STA (220) perform beamforming training on one channel (e.g., the primary channel within the system), among the multiple channels that are supported by the wireless LAN system. A detailed signal transmission/reception operation for this process may include SSW frame (or Short SSW frame) transmission/reception and SSW ACK transmission/reception, as shown in FIG. 11 to FIG. 16.

Most particularly, in step S2010, the initiator STA (210) may transmit one or more SSW frames (or Short SSW frames) to the responder STA (220) through the one channel and may, then, receive an SSW ACK from the responder STA (220) through the one channel. Thereafter, the initiator STA (210) may determine a best sector information corresponding to the one channel based on the received SSW ACK.

In response to this, in step S2010, the responder STA (220) may also know the best sector information of the initiator STA (210) corresponding to the one channel.

Additionally, in step S2010, the responder STA (220) may also know the (RX) best sector information of the responder STA (220) corresponding to the one channel. In this case, the responder STA (220) may receive a signal, which is transmitted from the initiator STA (210) in step S2020 and step S2040, by using/based on the (RX) best sector information of the responder STA (220) corresponding to the one channel (in case the data transmission/reception method of the station according to the present invention is configured of 3 phases (or steps)), or the responder STA (220) may receive a signal, which is transmitted from the initiator STA (210) in step S2020 by using/based on the (RX) best sector information of the responder STA (220) corresponding to the one channel (in case the data transmission/reception method of the station according to the present invention is configured of 4 phases (or steps)).

In step S2020, by transmitting and/or receiving a signal to and from the responder STA (220) by using/based on the based sector information corresponding to the one channel, which is determined in step S2010, the initiator STA (210) determines at least one channel through which data is to be transmitted and a data transmission method using/through the at least one channel in step S2040. In response to this, by transmitting and/or receiving a signal to and from the initiator STA (210), the responder STA (220) may determine at least one channel through which data is to be received and a data reception method using/through the at least one channel. At this point, in case the RX best sector information of the responder STA (220) is determined in step S2010, the responder STA (220) may transmit and/or receive a signal to and from the initiator STA (210).

A detailed signal transmission/reception operation for this may include setup frame (e.g., RTS frame) transmission/reception and feedback frame (e.g., DMG CTS frame) transmission/reception, as shown in FIG. 11, FIG. 15 to FIG. 18.

More specifically, the initiator STA (210) transmits a setup frame for each channel to the responder STA (220) by applying the best sector information for the one channel, which is determined in step S2010, to all or part of the multiple channels including the one channel. And, then, the initiator STA (210) receives a feedback frame for each setup frame for each channel through each channel from the responder STA (220). Accordingly, the best sector information, which is determined in step S2010, may be applied and transmitted to the setup frame, which is transmitted through the plurality of channels, as shown in FIG. 11, FIG. 15 to FIG. 18.

At this point, the setup frame may include channel information and channel bandwidth information that are required by the initiator STA (210) for performing data transmission. As a response to this, the feedback frame may include information on the channel (channel information) that is actually available to the responder STA (220) for performing data reception and channel bandwidth information in response to the setup frame.

Accordingly, the initiator STA (210) may determine a data transmission method using at least one channel that are intended to transmit the data and a data transmission method using/through the at least one channel based on the received feedback information.

Herein, a channel bonding method, a channel aggregation method, and an FDMA method may be applied to the data transmission method that can be applied to the present invention. At this point, the channel bonding method may refer to a method for transmitting the data by bonding multiple consecutive channels, and the channel aggregation method may refer to a method for transmitting the data by aggregating multiple consecutive or non-consecutive channels.

Additionally, among the data transmission/reception methods of the station that can be applied to the present invention, according to the data transmission/reception method that is configured of 4 phases (or steps) (S2010, S2020, S2030, S2040), in step S2020, the initiator STA (210) may notify the responder STA (220) whether or not to perform beamforming training on multiple channels through the setup frame. In response to this, the responder STA (220) may notify the initiator STA (210) whether or not the beamforming training on the multiple channels is possible through the feedback frame.

Also, the responder STA (220) may notify the initiator STA (210) which type of beamforming training method (e.g., I-TXSS, I-TXSS, R-TXSS, R-RXSS, TX beamforming, RX beamforming, TX and RX beamforming) is to be performed in step S2030.

Among the data transmission/reception methods of the station that can be applied to the present invention, according to the data transmission/reception method that is configured of 3 phases (or steps) (S2010, S2020, S2040), in step S2040, the initiator STA (210) may transmit the data to the responder STA (220) through at least one channel, which are determined in step S2020, by applying the determined data transmission method for the at least one channel. More specifically, after applying the best sector information, which is determined in step S2010, to each of the determined at least one channel, the initiator STA (210) may transmit the data to the responder STA (220) by using/based on the determined data transmission method.

Alternatively, among the data transmission/reception methods of the station that can be applied to the present invention, according to the data transmission/reception method that is configured of 4 phases (or steps) (S2010, S2020, S2030, S2040), the data transmission/reception methods of the station that can be applied to the present invention may further include step S2030.

In step S2030, the initiator STA (210) may perform beamforming training on at least one channel, which are determined as the channel(s) for transmitting the data in step S2020.

According to a detailed signal transmission/reception operation for this process, the initiator STA (210) may transmit one or more SSW frames (or Short SSW frames) or BRP frames to the responder STA (220) and may then receive a response frame corresponding to the transmitted frame(s) from the responder STA (220).

At this point, the initiator STA (210) may determine the best sector information for the at least one channel, which are determined as at least one channel for transmitting data in step S2020, based on the received response frame.

Accordingly, in step S2040, the initiator STA (210) may transmit data to the responder STA (220) by applying the best sector information for the at least one channel, which are determined in step S2030 as at least one channel for transmitting data in step S2020, and the data transmission method, which is determined in step S2020. In response to this, the responder STA (220) may receive the data, which is transmitted by the initiator STA (210) as described above.

4. Device Configuration

Figure 21:
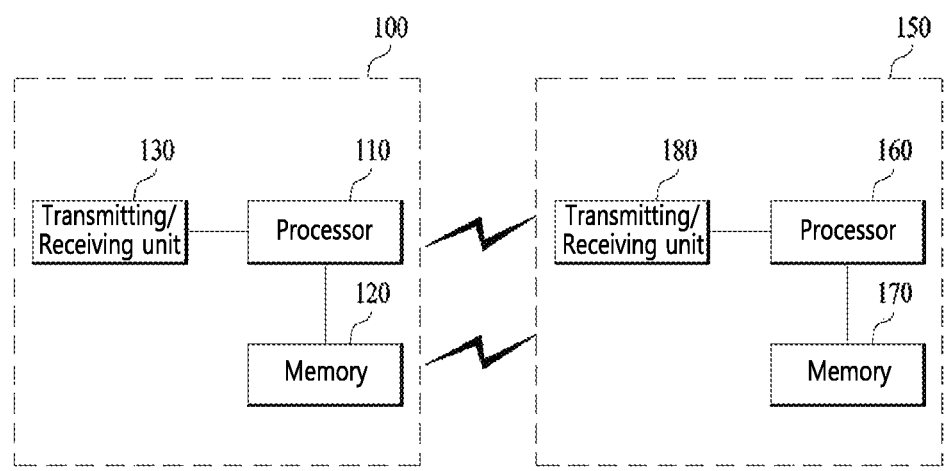
FIG. 21 is a diagram showing a device for implementing the above-described method.

FIG. 21 is a diagram describing a device for implementing the above-described method.

A wireless device (100) of FIG. 21 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using/based on the same method as presented herein.

What is claimed is:

1. A method used in a wireless LAN (WLAN) system, the method performed by a transmitting station (STA) and comprising:

transmitting a setup frame to a receiving STA, wherein the setup frame includes a first bandwidth field including first information related to a bandwidth of requested channels, wherein the requested channels include a first channel and a second channel, wherein the first channel and the second channel are aggregated;

receiving a feedback frame from the receiving STA, wherein the feedback frame includes a second bandwidth field including second information related to a bandwidth of accepted channels, wherein the second bandwidth field has a same value as the first bandwidth field;

performing a beamforming training on the first and second channels, wherein the transmitting STA transmits a first Beam Refinement Protocol (BRP) frame to the receiving STA and receives a second BRP frame from the receiving STA through the first and second channels while performing the beamforming training, wherein a training (TRN) field is included in an end of the first BRP frame and an end of the second BRP frame; and transmitting data to the receiving STA through the first and second channels based on the beamforming training.

2. The method of claim 1, wherein the bandwidth of the requested channels is set to 2.16+2.16 GHz or 4.32+4.32 GHz.

3. The method of claim 1, wherein the setup frame further includes third information related to whether the requested channels are aggregated to one another.

4. A transmitting station (STA) in a wireless LAN (WLAN) system, comprising:

a transceiver configured to transmit and/or receive a wireless signal; and a processor configured to control the transceiver, wherein the processor is configured to:
  transmit a setup frame to a receiving STA, wherein the setup frame includes a first bandwidth field including first information related to a bandwidth of requested channels, wherein the requested channels include a first channel and a second channel, wherein the first channel and the second channel are aggregated;
  receive a feedback frame from the receiving STA, wherein the feedback frame includes a second bandwidth field including second information related to a bandwidth of accepted channels, wherein the second bandwidth field has a same value as the first bandwidth field;
  perform a beamforming training on the first and second channels, wherein the transmitting STA transmits a first Beam Refinement Protocol (BRP) frame to the receiving STA and receives a second BRP frame from the receiving STA through the first and second channels while performing the beamforming training, wherein a training (TRN) field is included in an end of the first BRP frame and an end of the second BRP frame; and
  transmit data to the receiving STA through the first and second channels based on the beamforming training.

5. The transmitting STA of claim 4, wherein the bandwidth of the requested channels is set to 2.16+2.16 GHz or 4.32+4.32 GHz.

6. The transmitting STA of claim 4, wherein the setup frame further includes third information related to whether the requested channels are aggregated to one another.

7. A receiving station (STA) in a wireless LAN (WLAN) system, comprising:
  a transceiver configured to transmit and/or receive a wireless signal; and
  a processor configured to control the transceiver,
  wherein the processor is configured to:
  receive a setup frame from a transmitting STA, wherein the setup frame includes a first bandwidth field including first information related to a bandwidth of requested channels, wherein the requested channels include a first channel and a second channel, wherein the first channel and the second channel are aggregated;
  transmit a feedback frame to the transmitting STA, wherein the feedback frame includes a second bandwidth field including second information related to a bandwidth of accepted channels, wherein the second bandwidth field has a same value as the first bandwidth field;
  perform a beamforming training on the first and second channels, wherein the receiving STA receives a first Beam Refinement Protocol (BRP) frame from the transmitting STA and transmits a second BRP frame to the transmitting STA through the first and second channels while performing the beamforming training, wherein a training (TRN) field is included in an end of the first BRP frame and an end of the second BRP frame; and
  receive data from the transmitting STA through the first and second channels based on the beamforming training.

8. The receiving STA of claim 7, wherein the bandwidth of the requested channels is set to 2.16+2.16 GHz or 4.32+4.32 GHz.

9. The receiving STA of claim 7, wherein the setup frame further includes third information related to whether the requested channels are aggregated to one another.

* * * * *